Figure 1:
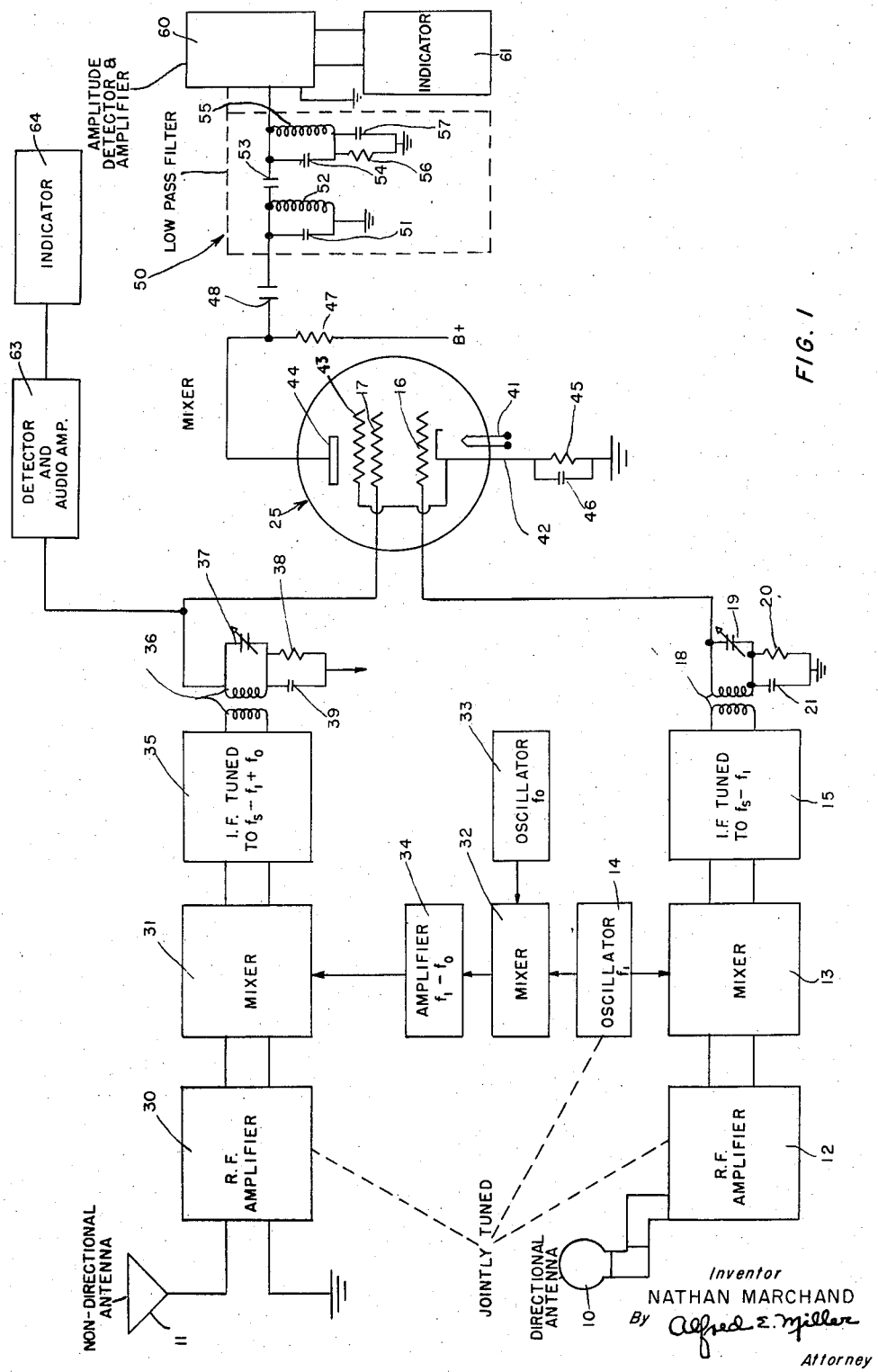

Sept. 23, 1958   N. MARCHAND   2,853,705
DIRECTION FINDING SYSTEM
Filed Feb. 3, 1953

Inventor
NATHAN MARCHAND
By Alfred E. Miller
Attorney and Patent Office 2,853,705
Patented Sept. 23, 1958

2,853,705
DIRECTION FINDING SYSTEM
Nathan Marchand, Greenwich, Conn.
Application February 3, 1953, Serial No. 334,836
5 Claims. (Cl. 343—113)

This invention relates to direction finding systems and more particularly to direction finding receiving systems for determining the direction from which electromagnetic radiation is emanating.

Conventional direction finding systems generally employ a directional antenna, in the form of a loop antenna, whose orientation with respect to the source of the received radiation will produce varying amplitude signals from the output circuit of the system. The loop antenna is usually rotated until a null is obtained at the output of the system, at which time the plane of the loop is at right angles to the source of the radiation. In many practical applications such direction finding systems suffer from a major drawback which extremely limits their applicability and usefulness, namely, poor sensitivity. Consequently, these conventional systems are generally limited to determining the direction solely of strong sources of radiation. When the source of the radiation is interfered with, deliberately or accidently, or when the source is weak or there is a low signal-to-noise ratio, the conventional system is essentially no longer able to accurately determine the direction of the source.

The main object of the invention is to provide a directional receiving system capable of determining the direction of a complex signal emanating from a weak source of radiation.

A further object of the invention is to improve the signal-to-noise ratio of a directional receiving system while maintaining its angular selectivity.

These and further objects of the invention will be best understood from the following description.

Broadly speaking, I have found that by receiving the radiation, the direction of which is to be ascertained, by two independent antennas, and by coupling the output circuits of the two antennas through a mixer followed by a low pass or narrow band-pass filter network, the signal-to-noise ratio will improve proportional to the ratio of the bandwidth of the transmission to the bandwidth of the filter.

In its simplest form, my invention contemplates the use of two independent antennas, the first a directional antenna, and the second any broadly directional or non-directional antenna. The desired signal or radiation, which may be any type of signal including voice, code, navigational signals (AM or FM) and even a noise signal, is separately received by each of the antennas. The two signals at the outputs of the antennas are then applied to any conventional type of mixer, and the output of the mixer is passed through a low pass or narrow band-pass filter network tuned to the frequency of the signal containing the directional information. The output of the filter may then be detected, amplified, and caused to actuate an indicator in the conventional manner. Rotation of the directional antenna will produce the usual varying amplitude signal at the indicator and the null indication will give the correct direction.

Among the advantages obtainable from the arrangement according to the invention is a material increase in the signal-to-noise ratio. As a matter of fact, I have found it possible to determine the direction of signals in which the signal-to-noise ratio is negative in the original reception. That is to say, even though the amplitude of the signal is less, even considerably less, than the noise level, it is possible to select the signal from the noise, by employing the arrangement disclosed in the invention. Furthermore, interference with the desired signal will be reduced. A still further advantage is that the system can detect and find the direction of all types of signals, e. g., voice, code, navigational, no matter how complexly modulated, e. g., AM, FM, pulse, phase, and can even determine the direction of a noise source.

A preferred embodiment according to the invention involves passing the signal received by the non-directional antenna through an amplifier and thereafter mixing with a signal generated by a local oscillator having a frequency $f_0$. The signal received by the directional antenna is similarly amplified and mixed with a signal having a frequency displaced from $f_s$ by a frequency $f_1$. The two resultant signals from the output of the mixers, which until this time have been completely separated, are now mixed and the output signal from the mixer passed through a narrow band-pass filter network tuned to the frequency $f_0$.

The phase of the signal coming out of the filter contains all of the directional phase information obtainable from the two input antennas, i. e., the phase relationship between the output signal from the filter and the oscillator signal $f_0$ is determined by the time delay between the signal appearing at the non-directional antenna and the signal appearing at the directional antenna. The output from the filter is detected, amplified, and applied to an indicator in the conventional manner.

A modification of the above-described embodiment involves removing a portion of the non-directional signal, after the first mixing operation, and separately detecting and amplifying the same to produce an audible signal in order to determine whether any intelligence exists in the received signal. For this purpose, an intermediate frequency amplifying stage can be provided after the first mixing stage, and the signal removed at the output of this amplifier.

The invention will now be described with reference to the accompanying drawings in which:

The figure shows a circuit diagram, partially block, of one embodiment of the invention.

Referring to the figure, a directional receiving system according to the invention comprises a pair of antennas 10, 11, one antenna 10 being any antenna exhibiting a directivity characteristic, the other antenna 11 being any non-directional or broadly-directional antenna, preferably one having a high gain and no dead spots in its pattern. These antennas 10, 11 each receive the radiation of which the direction is to be determined. Considering first the directional antenna circuit, the signal received by the directional antenna 10, which will hereinafter be referred to as $f_s$, is passed through a conventional radio frequency amplifier 12, the output of which is coupled to one of two inputs of a conventional first mixer stage 13, e. g., a pentagrid converter or any similar device for obtaining the difference frequency between two signals. The other input to the first mixer 13 is coupled to the output of a tunable oscillator 14 which produces a signal oscillating at a frequency $f_1$. Consequently, the signal appearing at the output of the first mixer 13 contains, among other components, a signal having a frequency $(f_s-f_1)$. The output signal $(f_s-f_1)$ is passed through a conventional intermediate frequency amplifier stage 15 tuned to the signal frequency $(f_s-f_1)$, and the amplified output signal $(f_s-f_1)$ of the amplifier stage 15 is applied to the grid 16 of a second mixer stage 25 by means of a coupling transformer 18, the secondary of which is connected in parallel with a variable capacitor 19 and is grounded through the parallel combination of a resistor 20 and a capacitor 21.

The non-directional antenna 11 receives the same signal $f_s$ received by the directional antenna 10; however, since its gain is substantially larger than the gain of the directional antenna, the amplitude of signal $f_s$ from this antenna 11 and, of course, its signal-to-noise ratio is considerably greater. The signal $f_s$ is then similarly passed through a radio frequency amplifier 30, the output of which is coupled to one of the two inputs of a first mixer stage 31. This amplifier 30 is jointly tuned with the R. F. amplifier 12 and the oscillator 14. The other input to this mixer 31 is supplied by a signal having a frequency displaced $f_0$ cycles from the frequency $f_1$ of the oscillator 14. This is achieved by mixing the signal $f_1$ in a third mixer stage 32 with a signal having a frequency $f_0$ produced by a fixed local oscillator 33, e. g., a crystal oscillator. The signal from the output of this third mixer 32 is amplified in an amplifier 34 tuned to the frequency $(f_1-f_0)$ and supplied to the first mixer 31. The output signal from the first mixer 31 is passed through an intermediate frequency amplifier 35 tuned to the signal $(f_s-f_1+f_0)$, which is one of the mixed signal components appearing in the output circuit of the mixer 31. The signal $(f_s-f_1+f_0)$ at the output of the I. F. amplifier 35 is fed to a second grid 17 of the second mixer 25 through a coupling transformer 36, the secondary of which is coupled to a variable capacitor 37 and connected to a positive potential through the parallel combination of a resistor 38 and a capacitor 39. It is obvious that two crystal-controlled oscillators tuned to the difference frequency $f_0$ may also be employed.

The second or final mixing stage 25 which is shown as a pentode tube, though it may be any other conventional type of mixer, e. g., a triode, diode, crystal, pentagrid converter or any similar device for obtaining the difference frequency between two signals, comprises a heating filament 41, a cathode 42, a suppressor grid 43 connected internally to the cathode 42, an anode 44, and the two mixing grids 16 and 17. The cathode 42 is grounded through a capacitor 45 and a resistor 46 connected in parallel. The anode circuit is connected to a suitable source of potential B+ through a resistor 47.

The two signals $(f_s-f_1)$ and $(f_s-f_1+f_0)$ are applied, respectively, to the two mixing grids 16 and 17 of the second mixer stage 25. These two signals beat together in this stage 25 thereby producing a number of different frequency components in the anode or output circuit, among which is the frequency $f_0$. The complete signal at the anode circuit is passed through a coupling capacitor 48 and then through a low pass or narrow band-pass filter network 50 tuned to the frequency $f_0$ and comprising a parallel-connected capacitor 51 and inductor 52 coupled by means of a capacitor 53 to another parallel-connected capacitor 54 and inductor 55. One terminal of the first capacitor-inductor combination 51, 52 is grounded, while a similar terminal of the second capacitor-inductor combination 54, 55 is grounded through a resistor 56 and capacitor 57 in parallel relationship. By suitably choosing values for the various inductors, capacitors and resistors of the filter network 50, it can be assured that only the frequency $f_0$ with a bandwidth determined by the design constants of the system will appear at the output of the network 50, while all the other frequency components of the input signal will be filtered out. The bandwidth of the filter network 50 will be determined by the design parameter of the system, the only requirement of the filter 50 being that it exclude all undesired parts of the spectrum of the input signal except the narrow frequency band centered around the frequency $f_0$. In most cases, the width of the narrow frequency band is as narrow as possible while still allowing for all search and all drift, and preferably is between 1 to 100 C. P. S. Of course, it is to be understood that minor deviations from the above figure will still be permissible in order to obtain the results of the invention.

The signal $f_0$ is then passed through a detector stage followed by an amplifier 60 and applied to any suitable form of indicator 61, for example, a meter. Rotation of the directional antenna 10 will cause the meter reading to vary as in any conventional type of radio-direction finding system. At the null point of the meter reading, the plane of the loop antenna 10 will be at right angles to the source of the received signal $f_s$.

According to the embodiment, part of the signal applied to the grid 17 of the pentode tube 25 may be tapped off and separately detected and amplified in amplifier 63 and applied to a speaker-indicator 64 in order to determine whether any intelligence exists in the received signal $f_s$.

For example, but I wish it to be understood that I do not intend to be limited thereby, I will now describe the embodiment shown in the figure assuming a received signal $f_s$ having a frequency of about two megacycles in order to show typical values of the components of an arrangement in accordance with my invention.

The two R. F. amplifiers 12 and 30 will, of course, be tuned to a frequency of 2 M. C. P. S. The tunable oscillator 14, which is jointly tuned with the R. F. amplifiers 12 and 30 generators a signal $f_1$ equal to 1.5 M C. P. S. Consequently, the I. F. amplifier 15 is tuned to 500 kc. The fixed local oscillator 33 is arranged to generate a frequency $f_0$ equal to 20 kc. The third mixer 32 mixes the 1.5 M C. P. S. signal generated by the tunable oscillator 14 with the fixed local oscillator 33 producing a signal having a frequency of 1.48 M C. P. S. This 1.48 M C. P. S. signal is passed through an amplifier 34 tuned to that signal and applied to the mixer 31 which mixes that signal with the signal $f_s$ of 2 M C. P. S. The resultant is passed through an I. F. amplifier 35 tuned to 520 K C. P. S. The 500 K C. P. S. and 520 K C. P. S. signals are then mixed in the second mixer stage 25, which is shown as a pentode tube. All of the preceding amplifiers and mixers preferably have broad band-pass characteristics. The output circuit of the second mixer stage 17 is coupled to the narrow band-pass filter network 50 centered at 20 K C. P. S. and having a bandwidth of about 100 C. P. S. The 20 K C. P. S. signal is then detected, amplified and applied to an indicator in a conventional manner.

While I have shown and described a preferred embodiment of my invention, it will be understood that the latter may be embodied otherwise than as herein specifically illustrated or described and that in the illustrated embodiment certain changes in the details of the components and in the arrangement of parts may be made without departing from the underlying idea or principle of the invention within the scope of the appended claims.

What I claim is:

1. A direction finding receiving system comprising first antenna means and second antenna means for separately receiving the same radiation and transforming it into electrical signals, first oscillating means for generating a signal having a frequency $f_1$, first mixing means coupled to said first antenna and said first oscillator for mixing the signals produced thereby, second oscillating means for generating a signal having a frequency $f_0$, second mixing means coupled to said first and second oscillators for mixing the signals produced thereby, third mixing means coupled to said second antenna and said second mixer for mixing the signals produced thereby, fourth mixing means coupled to said first and third mixers for mixing the signals produced thereby and generating an electric signal having a frequency of $f_0$, low pass filter means coupled to said fourth mixer and centered at the frequency $f_0$, and indicating means coupled to said filter for indicating the direction of said radiation.

2. A direction finding receiving system comprising first directional antenna means and second non-directional antenna means for separately receiving the same radiation and transforming it into electrical signals, first oscillating means for generating a signal having a frequency $f_1$, first mixing means coupled to said first antenna and said first oscillator for mixing the signals produced thereby, second oscillating means for generating a signal having a frequency $f_0$, second mixing means coupled to said first and second oscillators for mixing the signals produced thereby, third mixing means coupled to said second antenna and said second mixer for mixing the signals produced thereby, fourth mixing means coupled to said first and third mixers for mixing the signals produced thereby and generating an electric signal having a frequency $f_0$, narrow band-pass filter means coupled to said fourth mixer and centered at the frequency $f_0$, and indicating means coupled to said filter for indicating the direction of said radiation.

3. A direction finding receiving system comprising first antenna means and second antenna means for separately receiving the same radiation and transforming it into electrical signals, first oscillating means for generating a signal having a frequency $f_1$, first mixing means coupled to said first antenna and said first oscillator for mixing the signals produced thereby, second oscillating means for generating a signal having a frequency $f_0$, second mixing means coupled to said first and second oscillators for mixing the signals produced thereby, third mixing means coupled to said second antenna means and said second mixer for mixing the signals produced thereby, fourth mixing means coupled to said first and third mixers for mixing the signals produced thereby and generating an electric signal having a frequency of $f_0$, narrow band-pass filter means coupled to said fourth mixer and centered at the frequency $f_0$, and indicating means coupled to said filter for indicating the direction of said radiation.

4. A direction finding receiving system comprising first directional antenna means and second non-directional antenna means for separately receiving the same radiation and transforming it into electrical signals, first oscillating means for generating a signal having a frequency $f_1$, first mixing means coupled to said first antenna and said first oscillator for mixing the signals produced thereby, second oscillating means for generating a signal having a frequency $f_0$, second mixing means coupled to said first and second oscillators for mixing the signals produced thereby, third mixing means coupled to said second antenna means and said second mixer for mixing the signals produced thereby, fourth mixing means coupled to said first and third mixers for mixing the signals produced thereby and generating an electric signal having a frequency of $f_0$, narrow band-pass filter means coupled to said fourth mixer and centered at the frequency $f_0$, and indicating means coupled to said filter for indicating the direction of said radiation.

5. A direction finding receiving system as claimed in claim 4 in which detecting and audible indicating means are coupled to said third mixer in order to determine whether intelligence exists in said radiation.

References Cited in the file of this patent

UNITED STATES PATENTS

| | | |
|---|---|---|
| 1,598,144 | Leib | Aug. 31, 1926 |
| 1,724,019 | Harper | Aug. 13, 1929 |
| 2,040,952 | Peterson | May 19, 1936 |
| 2,166,991 | Guanella | July 25, 1939 |
| 2,282,402 | Hefele | May 12, 1942 |
| 2,422,073 | Bond | June 10, 1947 |
| 2,477,434 | Wirkler | July 26, 1949 |
| 2,718,638 | De Rosa et al. | Sept. 20, 1955 |